US012463386B2

(12) United States Patent
Chen

(10) Patent No.: US 12,463,386 B2
(45) Date of Patent: Nov. 4, 2025

(54) ELECTRICAL CONNECTOR HAVING METALLIC SHELL WITH UNITARY CONTACT FINGERS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Ming-Ching Chen, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 331 days.

(21) Appl. No.: 18/122,300

(22) Filed: Mar. 16, 2023

(65) Prior Publication Data

US 2023/0299542 A1 Sep. 21, 2023

(30) Foreign Application Priority Data

Mar. 16, 2022 (CN) ......................... 202220575251.2

(51) Int. Cl.
*H01R 13/6585* (2011.01)

(52) U.S. Cl.
CPC ................................ *H01R 13/6585* (2013.01)

(58) Field of Classification Search
CPC ............ H01R 13/6585; H01R 13/6471; H01R 12/716; H01R 12/73
USPC ............................................................ 439/74
See application file for complete search history.

(56) References Cited

U.S. PATENT DOCUMENTS

| | | | | |
|---|---|---|---|---|
| 8,292,630 | B1 * | 10/2012 | Bobuk | H01R 12/73 439/74 |
| 8,894,433 | B2 * | 11/2014 | Little | H01R 12/7005 439/378 |
| 10,446,985 | B2 | 10/2019 | Ooi | |
| 2013/0316566 | A1 * | 11/2013 | Little | H01R 12/7005 439/378 |
| 2018/0358729 | A1 * | 12/2018 | Chen | H01R 12/7088 |
| 2020/0212635 | A1 * | 7/2020 | Chen | H01R 12/73 |
| 2021/0175649 | A1 | 6/2021 | Amemori et al. | |
| 2021/0359473 | A1 * | 11/2021 | Oosaka | H01R 12/716 |
| 2021/0359474 | A1 | 11/2021 | Oosaka | |

FOREIGN PATENT DOCUMENTS

| | | |
|---|---|---|
| CN | 212485720 U | 2/2021 |
| CN | 214797804 U | 11/2021 |

* cited by examiner

*Primary Examiner* — Hae Moon Hyeon
(74) *Attorney, Agent, or Firm* — Ming Chieh Chang

(57) ABSTRACT

An electrical connector includes: an insulative housing having a receiving slot; plural contacts secured to the insulative housing and exposed to the receiving slot; and a metallic shell being secured to the insulative housing and having a pair of contact fingers, wherein each of the pair of contact fingers is disposed between selected two of the plurality of contacts.

3 Claims, 13 Drawing Sheets

ELECTRICAL CONNECTOR HAVING METALLIC SHELL WITH UNITARY CONTACT FINGERS

BACKGROUND OF THE INVENTION

1. Field of the Invention

The present invention relates to an electrical connector having an insulative housing, a plurality of contacts secured to the insulative housing, a metallic shell secured to the insulative housing, and one or more contact fingers or shields.

2. Description of Related Art

China Patent No. 212485720 discloses an electrical connector including an insulative housing, a plurality of contacts secured to the insulative housing, a metallic shell secured to the insulative housing, and four shield terminals separate from the metallic shell.

SUMMARY OF THE INVENTION

An electrical connector comprises: an insulative housing having a receiving slot; a plurality of contacts secured to the insulative housing and exposed to the receiving slot; and a metallic shell being secured to the insulative housing and having a pair of contact fingers, wherein each of the pair of contact fingers is disposed between selected two of the plurality of contacts.

DETAILED DESCRIPTION OF THE PREFERRED EMBODIMENT

Figure 1:
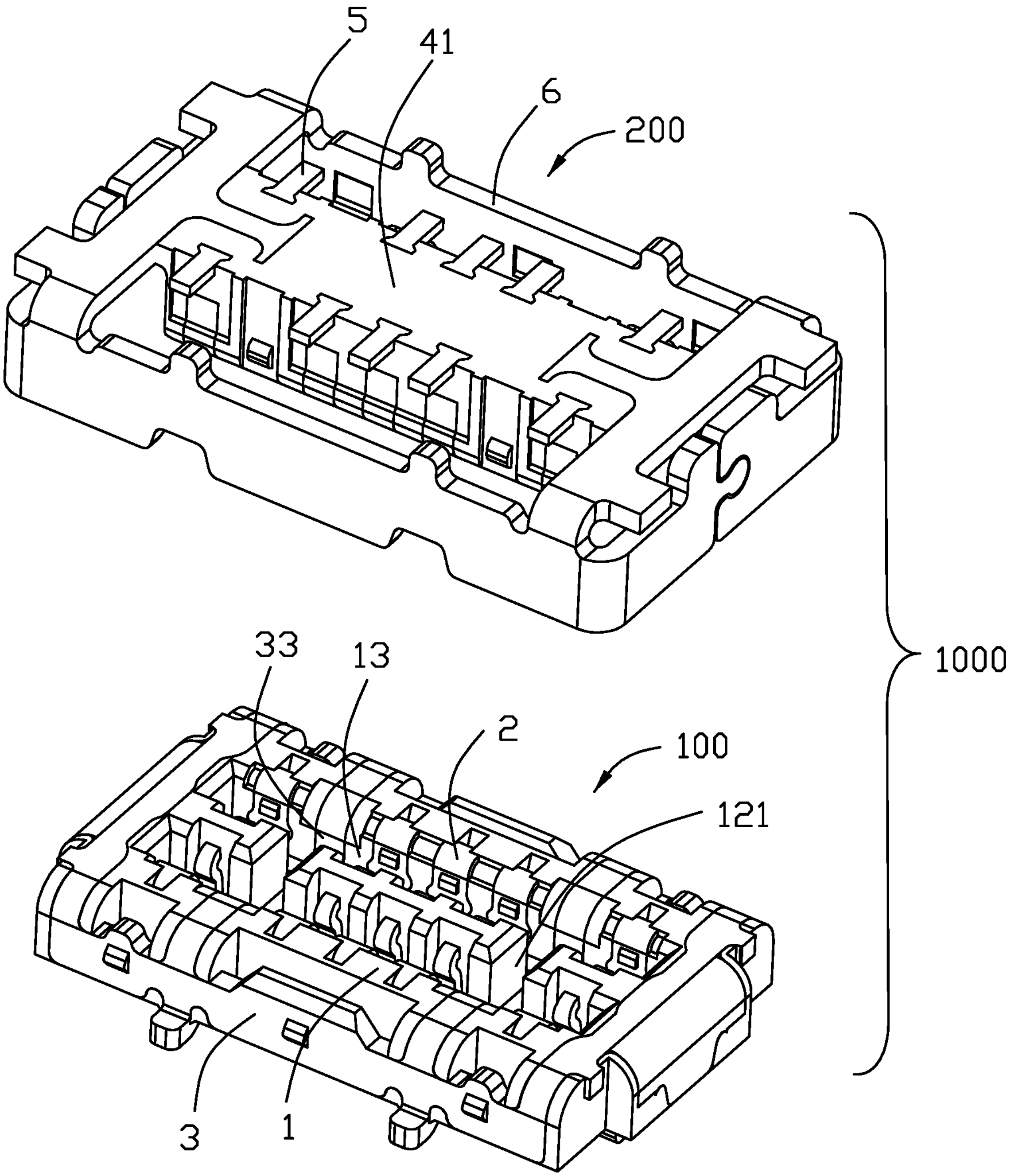
FIG. 1 is a perspective view of an electrical connector assembly in accordance with the present invention.
Figure 2:
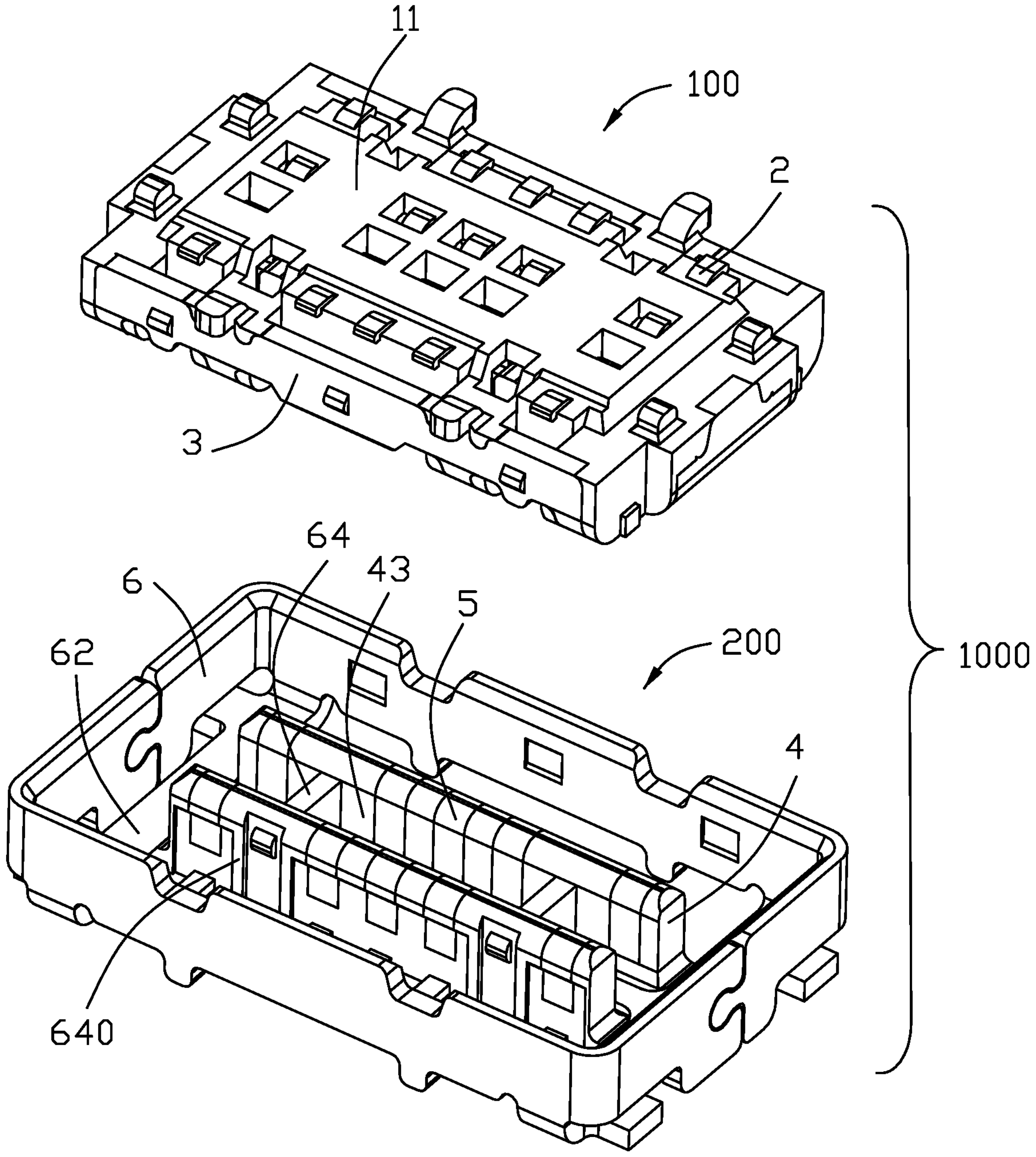
FIG. 2 is another perspective view of the electrical connector assembly.
Figure 3:
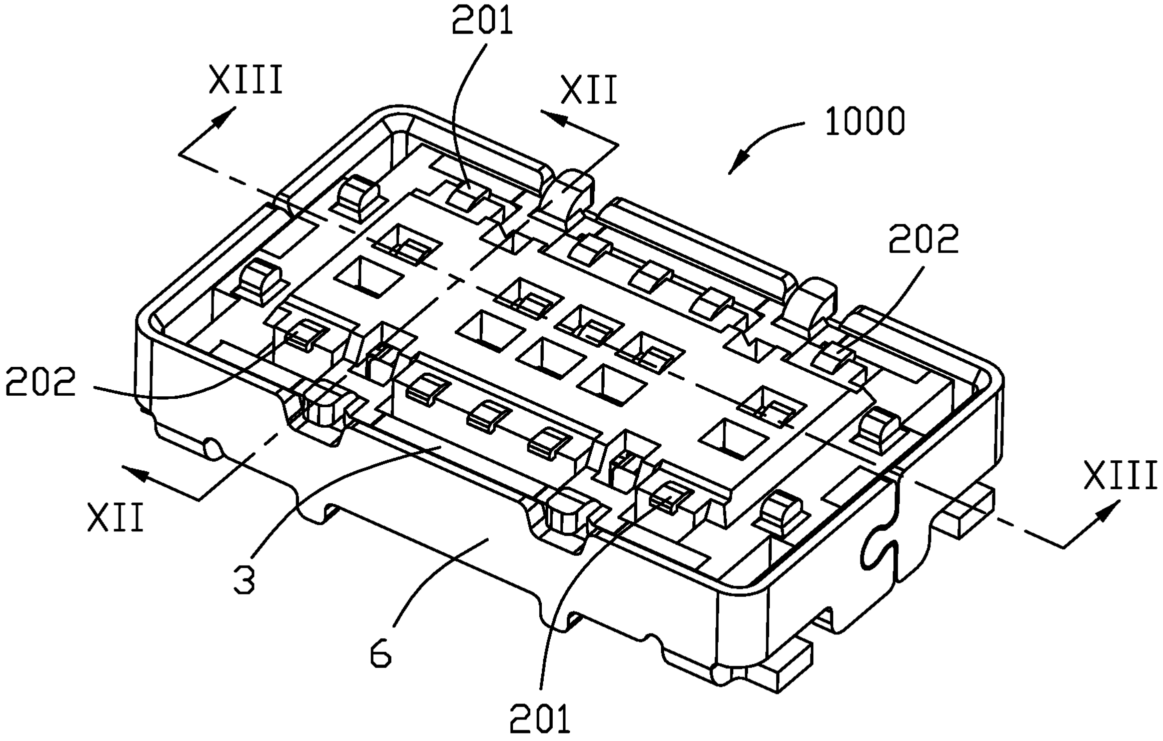
FIG. 3 is a mated view of the electrical connector assembly.
Figure 4:
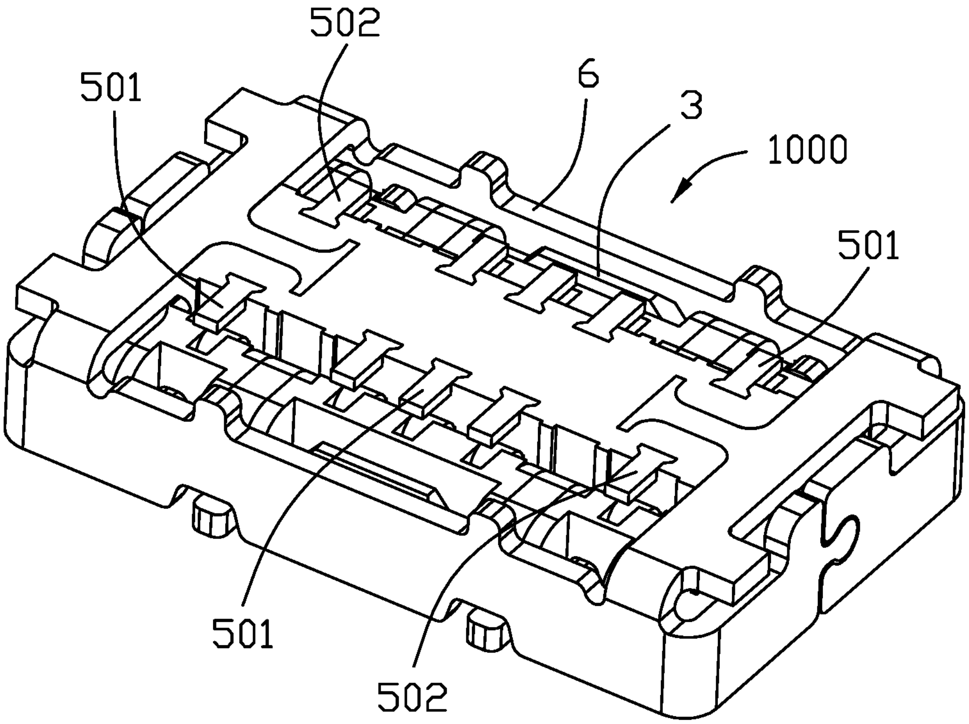
FIG. 4 is another mated view of the electrical connector assembly.

Referring to FIGS. 1-4, an electrical connector assembly 1000 includes an electrical connector 100, e.g., a board-end receptacle connector, and a mating electrical connector 200, e.g., a FPC-end plug connector. The receptacle connector 100 includes an elongate insulative housing 1 having a receiving slot 13, a plurality of contacts 2 secured to the insulative housing 1 and exposed to the receiving slot 13, and a metallic shell 3 secured to the insulative housing 1 and exposed to the receiving slot 13. The plug connector 200 includes an elongate insulative housing 4 having a receiving channel 43, a plurality of contacts 5 secured to the insulative housing 4 and exposed to the receiving channel 43, and a metallic shell 6 secured to the insulative housing 4.

Figure 5:
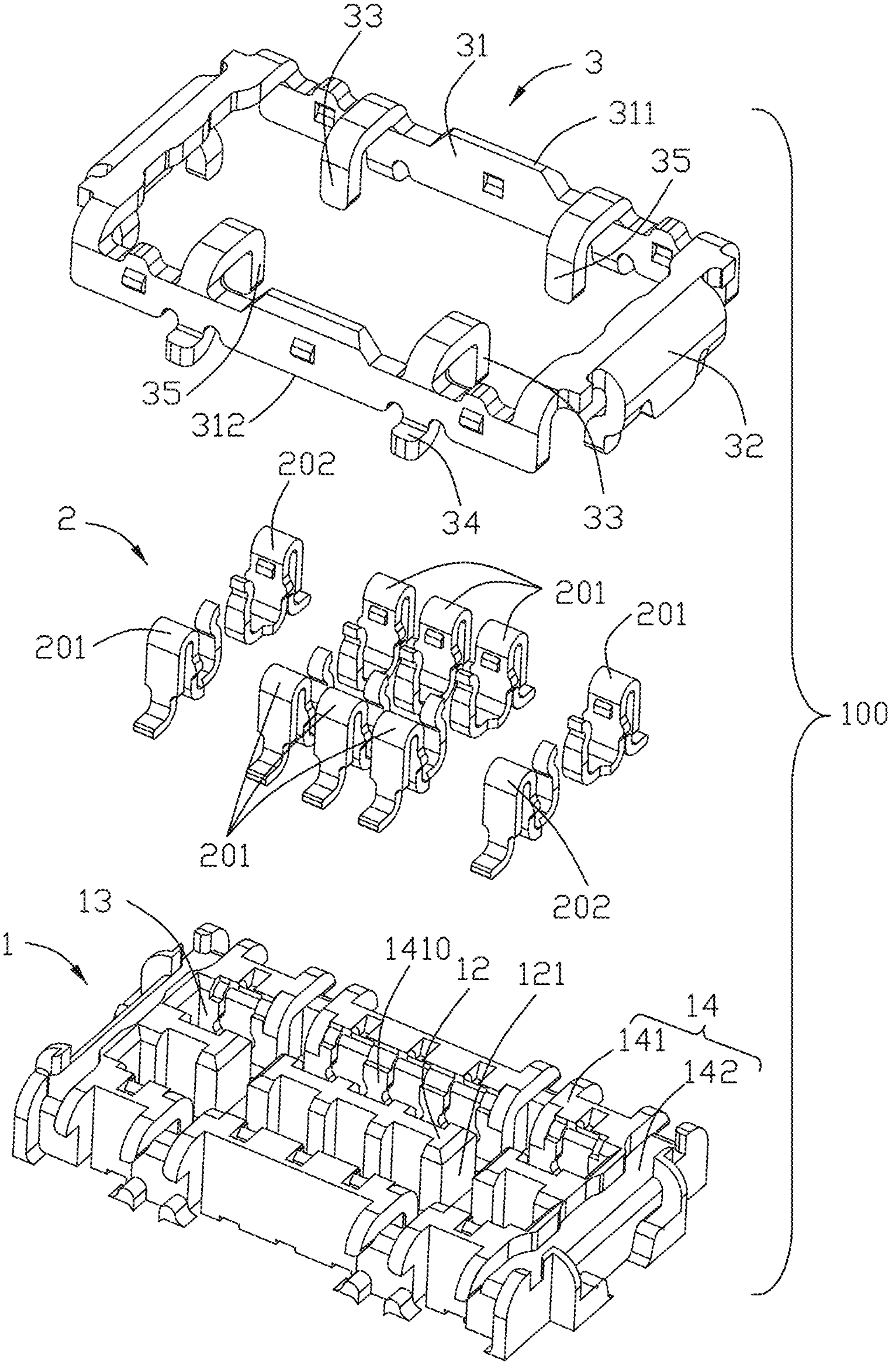
FIG. 5 is an exploded view of a receptacle connector of the electrical connector assembly.
Figure 6:
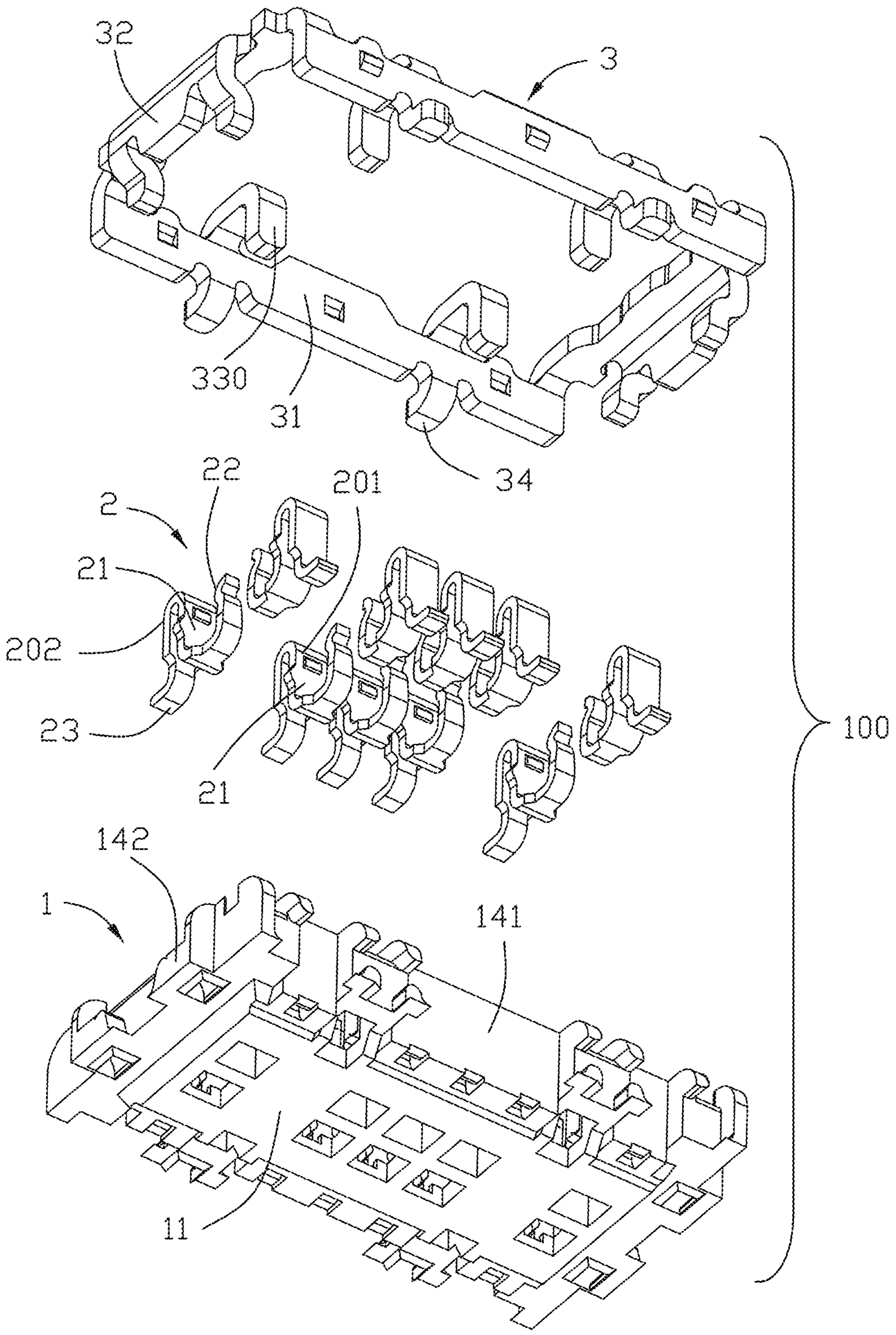
FIG. 6 is another exploded view of the receptacle connector.
Figure 7:
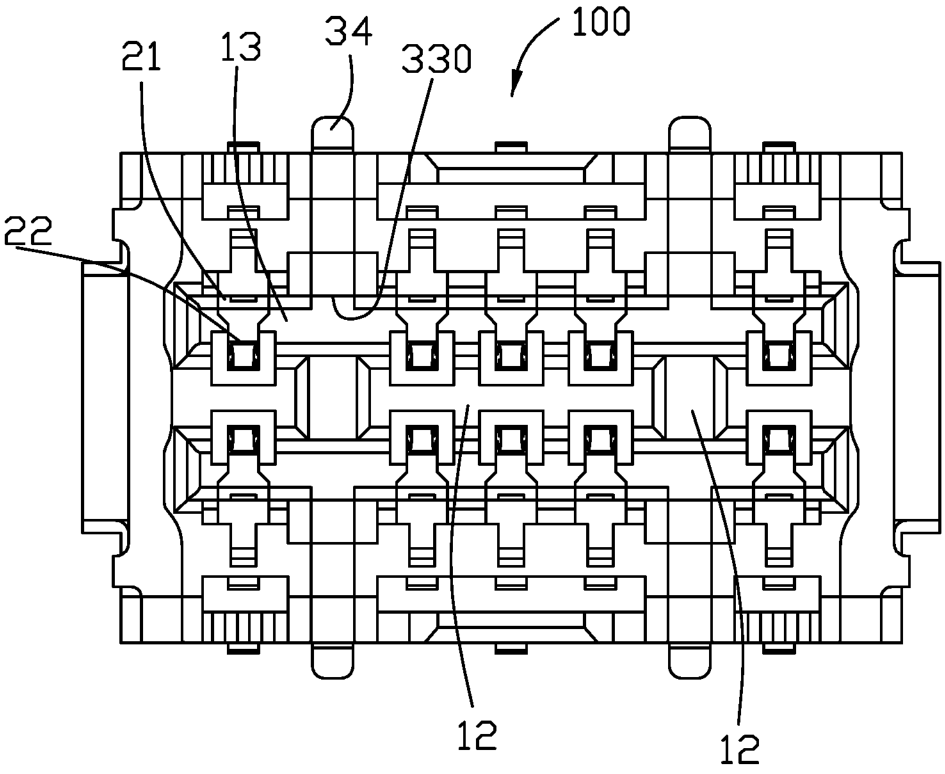
FIG. 7 is a top view of the receptacle connector.
Figure 8:
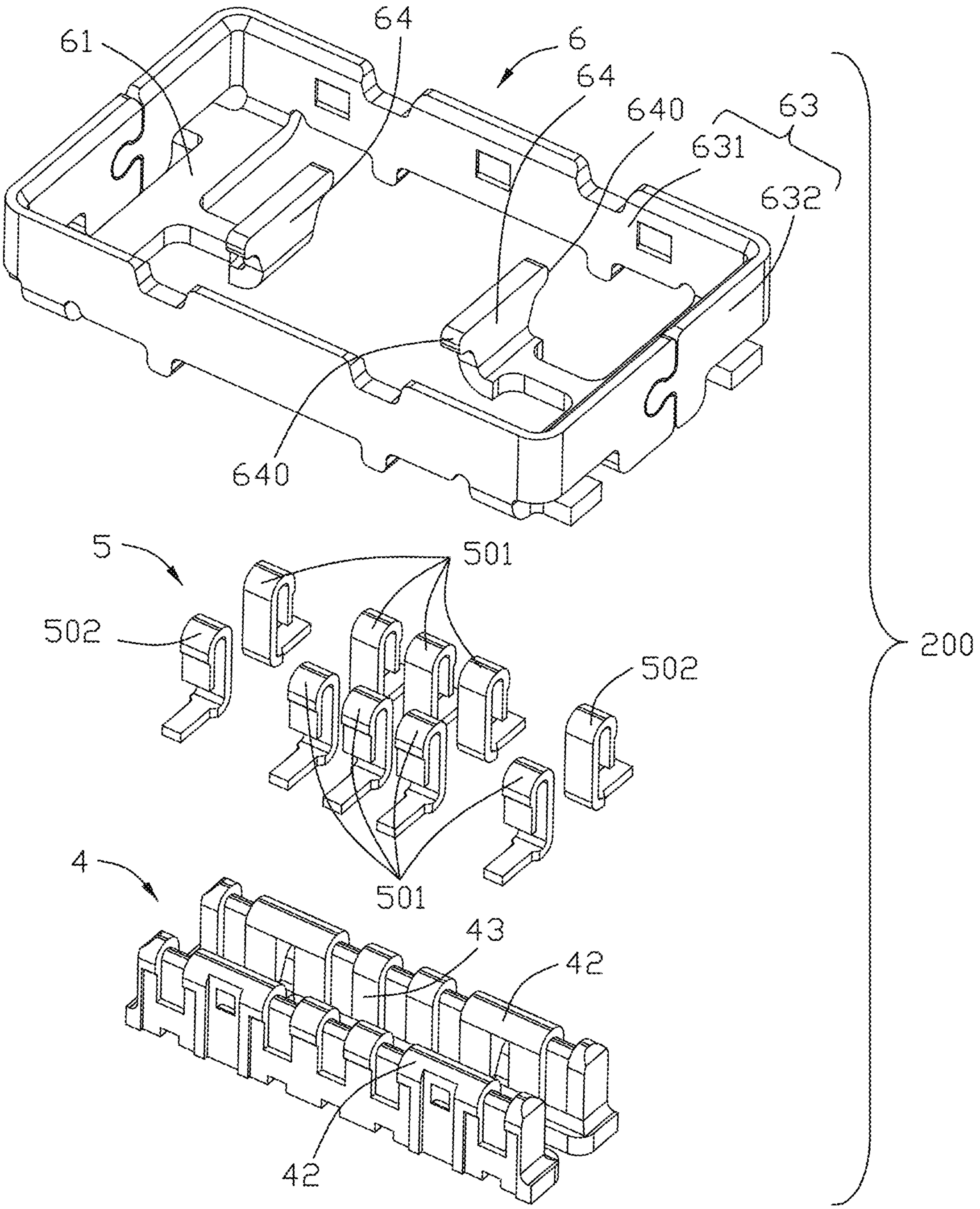
FIG. 8 is an exploded view of a plug connector of the electrical connector assembly.
Figure 9:
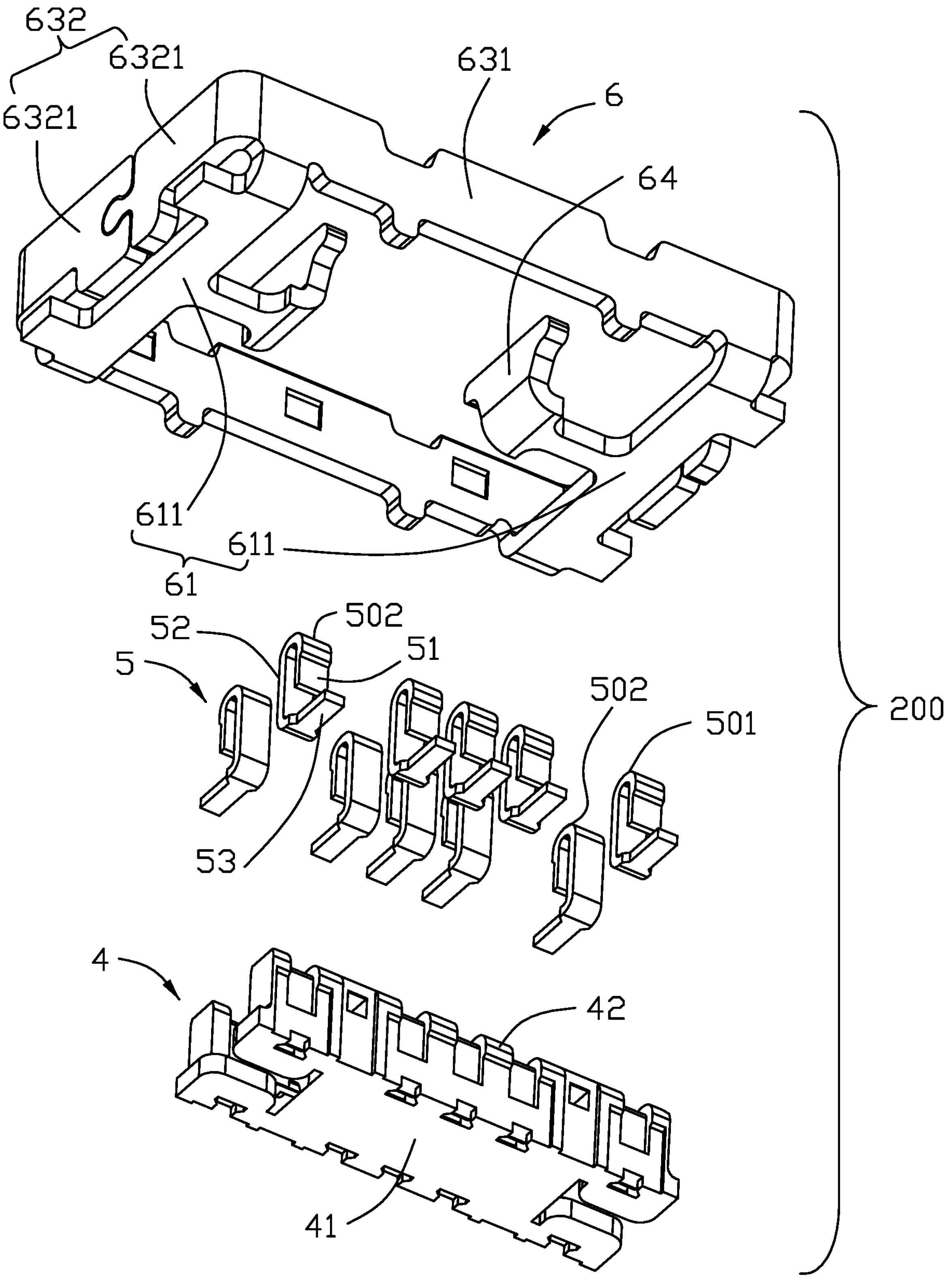
FIG. 9 is another exploded view of the plug connector.
Figure 10:
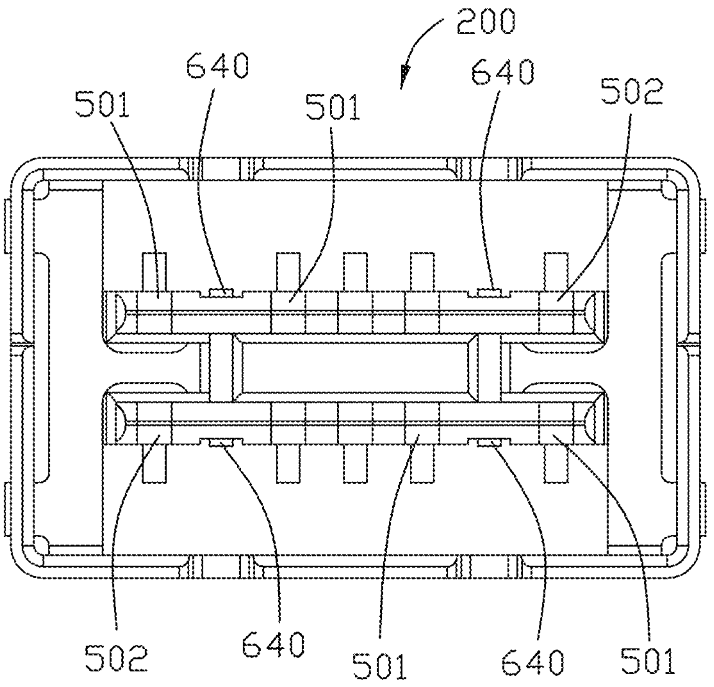
FIG. 10 is a top view of the plug connector.
Figure 11:
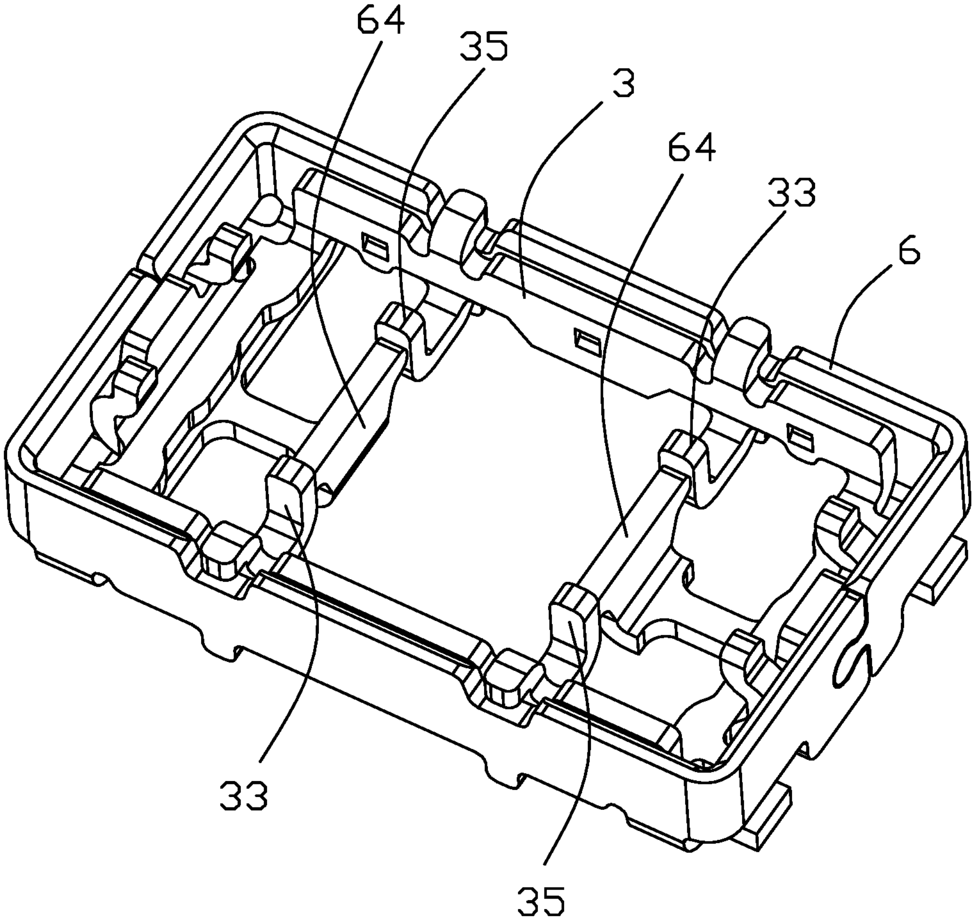
FIG. 11 is a mated perspective view of respective metallic shells of the receptacle connector and the plug connector.
Figure 12:
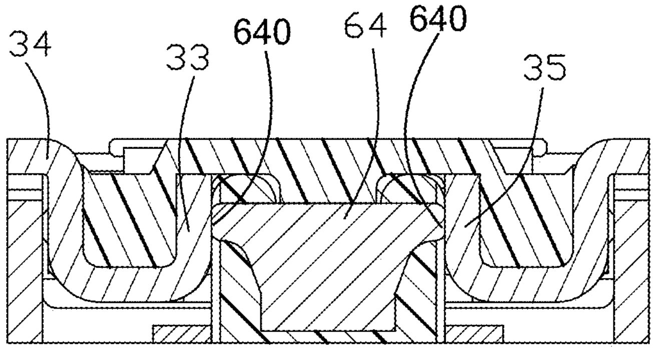
FIG. 12 is a cross-sectional view of the electrical connector assembly taken along line A-A in FIG. 3.
Figure 13:
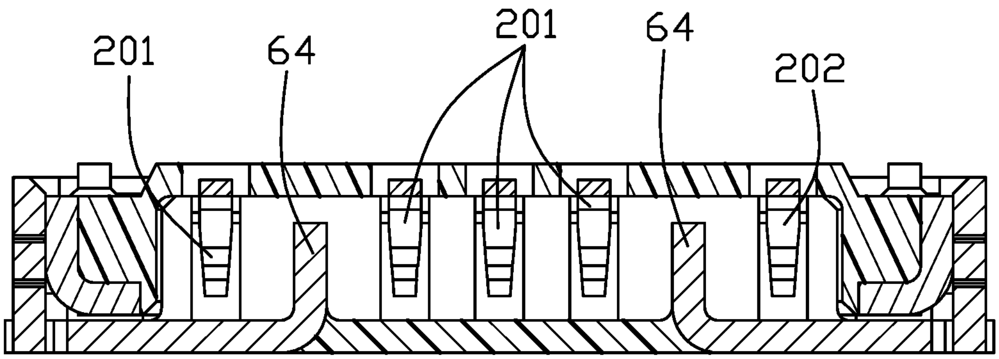
FIG. 13 is a cross-sectional view of the electrical connector assembly taken along line B-B in FIG. 3.

Referring to FIGS. 5-7, the insulative housing 1 of the receptacle connector 100 has a base 11, a tongue 12, and a peripheral wall 14, which together define the receiving slot 13. The contacts 2 are arranged, e.g., insert-molded, with the insulative housing 1 in two rows in a manner known in this art. The peripheral wall 14 includes a pair of side walls 141 and a pair of end walls 142. Each row of contacts may include low-speed contacts 201 and high-speed contacts 202.

The metallic shell 3 may be a unitary piece and has a pair of side walls 31, a pair of end walls 32, and a first contact finger 33 and a second contact finger 35 each disposed between selected two of the plurality of contacts 2 in order to reduce signal interference. The first and second contact fingers 33 and 35 may be provided on each side wall 31 and arranged diagonally. Specifically, the contact finger extends inwardly and downwardly from an upper portion 311 of the side wall 31 to be exposed to the receiving slot 13. A soldering leg 34 aligned with the contact finger 13 may be provided to extend outwardly from a lower portion 312 of the side wall 31.

In this embodiment, each row of contacts include four low-speed contacts 201 and two outermost high-speed contacts 202 and each contact finger 13 is disposed between one high-speed contact 202 and one low-speed contact 201.

The contact 2 has a first contact portion 21, a second contact portion 22, and a tail 23. The contact finger 33 or 35 has a contacting portion 330 located at an inner wall 1410 of the side wall 141. The contacting portion 330 is aligned with the first contact portions 21 of the contacts 2 in the same row and is equidistantly spaced.

Referring to FIGS. 8-13, the insulative housing 4 of the plug connector 200 has a base 41 and a pair of longitudinal walls 42, which together define the receiving channel 43. The metallic shell 6 has a base 61 and a peripheral wall 63 which together with the pair of longitudinal walls 42 defines a receiving space 62 for receiving the peripheral wall 14.

The contacts 5 are arranged, e.g., insert-molded, with the insulative housing 4 in two rows in a manner known in this art. Each contact 5 has a first contacting portion 51, a second contacting portion 52, and a tail 53. Correspondingly, each row of contacts may include low-speed contacts 501 and high-speed contacts 502. The metallic shell 6 has a pair of shields 64 bent from the base 61. Each shield 64 has a pair of contact points 640 exposed outside of the pair of walls 42 so as to be in touch with corresponding contact fingers 33 and 35. In this embodiment, each rows of contacts include four low-speed contacts 501 and two outermost high-speed contacts 502.

The metallic shell 6 may be a unitary piece. The peripheral wall 63 of the metallic shell 6 has a pair of side walls 631 and a pair of end walls 632. Each end wall 632 may be constructed of two interlocked halves 6321. The base 61 has two separated parts 611 each connected with the pair of side walls 631. The shield 64 is connected to an inner end of a corresponding base part 611 and is oriented generally vertically to be substantially parallel with the end wall 632. The tongue 12 of the receptacle connector 100 has a pair of slots 121 each for accommodating a corresponding shield 64.

Provision of the contact fingers 33 and/or 35 and the shields 64 and related structure enabling physical touch therebetween achieve a versatile arrangement of high-speed and low-speed contacts with signal interference reduction in a desired manner.

The invention claimed is:

1. An electrical connector assembly comprising:

a first connector including:

an insulative housing having a receiving slot;

a plurality of contacts secured to the insulative housing and exposed to the receiving slot; and a metallic shell being secured to the insulative housing and having a pair of contact fingers, each of the pair of contact fingers being disposed between selected two of the plurality of contacts; and a second connector being coupled to the first connector and including:

an insulative housing;

a plurality of contacts secured to the insulative housing and adapted for engaging the plurality of contacts of the first connector; and a metallic shell being secured to the insulative housing and having a pair of shields, each of the pair of shields being in touch with a corresponding contact finger.

2. The electrical connector assembly as claimed in claim 1, wherein each of the metallic shell of the first connector and the metallic shell of the second connector is a unitary piece.

3. The electrical connector assembly as claimed in claim 1, wherein:

each of the first connector and the second connector comprises two rows of contacts;

the metallic shell of the first connector comprises two pairs of contact fingers; and each of the pair of shields being in touch with a first contact finger of one pair of contact fingers and a second contact finger of the other pair of contact fingers.

* * * * *